United States Patent [19]
Veillette

[11] 3,937,533
[45] Feb. 10, 1976

[54] AXIALLY AND RADIALLY CONTROLLABLE MAGNETIC BEARING

[75] Inventor: Leo Veillette, Lanham, Md.

[73] Assignee: The United States of America as represented by the United States National Aeronautics and Space Administration Office of General Counsel-Code GP, Washington, D.C.

[22] Filed: Feb. 8, 1974

[21] Appl. No.: 440,917

[52] U.S. Cl. .................................................. 308/10
[51] Int. Cl.² ......................................... F16C 39/00
[58] Field of Search ........................................ 308/10; 74/5–5.7; 73/472, 473

[56] References Cited
UNITED STATES PATENTS

| | | | |
|---|---|---|---|
| 3,473,852 | 10/1969 | Lyman | 308/10 |
| 3,698,775 | 10/1972 | Gilbert | 308/10 |
| 3,779,618 | 12/1973 | Soglia | 308/10 |
| 3,811,740 | 5/1974 | Sacerdoti | 308/10 |

FOREIGN PATENTS OR APPLICATIONS

| | | | |
|---|---|---|---|
| 919,837 | 3/1947 | France | 308/10 |
| 267,861 | 8/1961 | Netherlands | 308/10 |

*Primary Examiner*—R. Skudy
*Attorney, Agent, or Firm*—Robert F. Kempf; John R. Manning

[57] ABSTRACT

An axially controllable magnetic bearing apparatus provides radial stiffness force control between a rotor and stator. The bearing includes a pair of axially spaced air gaps defined by corresponding pairs of annular pole pieces of the rotor and stator. Permanent magnets carried by the rotor generate constant axial bias fluxes in each of the air gaps. A pair of coils, disposed to axially excite the air gaps with variable flux, are driven in a manner so that the sum of the total fluxes in each of the air gaps is varied to change the radial stiffness between the bearing rotor and stator. Axial force between the rotor and stator is produced by exciting the two coils to vary the difference of the total air gap fluxes. The pair of coils are driven in a bridge circuit by pulse-width modulated signals. The radial stiffness force of the bearing is varied in response to a control system for radially damping the bearing rotor and/or for shifting the vibrational resources of the bearing to avoid a vibrational resonance condition.

12 Claims, 13 Drawing Figures

AXIALLY AND RADIALLY CONTROLLABLE MAGNETIC BEARING

ORIGIN OF THE INVENTION

The invention described herein was made by an employee of the United States Government and may be manufactured and used by or for the Government for governmental purposes without the payment of any royalties thereon or therefor.

FIELD OF THE INVENTION

The present invention relates generally to magnetic bearings. In particular, the present invention relates to a magnetic bearing wherein the same magnetic bearing air gaps are excited for both axial and radial force control.

BACKGROUND OF THE INVENTION

To overcome the problems of bearing friction in relatively large spinning structures, a pair of magnetic bearings have been used to suspend or levitate the ends of the axis of a spinning rotor relative to a stator by magnetic forces or flux concentrated in relatively narrow air or vacuum gaps between the bearing rotor and stator. These bearings can be particularly useful in a spacecraft environment to mount such devices as mechanically despun antennas. While axially controllable magnetic bearings have been used in combination with axial position sensors in a control loop necessary to provide axial stiffness of the suspended rotor location, constant rotor radial stiffness has been an inherent aspect of such axial bearings. For example, in the copending application of Phillip A. Studer, Ser. No. 100,637, filed Dec. 22, 1970, and assigned to the same assignee as the present invention, a single coil is provided to produce a differential flux in two axially aligned gaps for axial force or position control while a constant, permanent magnet produced, bias flux in the axially aligned gaps produces a constant radial stiffness.

OBJECTS OF THE INVENTION

It is an object of the present invention to provide a magnetic bearing having the capability of both axial and radial force control.

It is a further object of the present invention to provide a magnetic bearing having means for radially damping the bearing.

It is a still further object of the present invention to provide a magnetic bearing having means for changing the vibrational resonant frequency of the bearing.

SUMMARY OF THE INVENTION

As in prior art magnetic bearing structures, an axial magnetic bearing is provided with a pair of axially spaced air or vacuum gaps separating the rotor and the stator, which gaps are defined by pairs of corresponding facing annular pole pieces of the rotor and stator. The present invention differs from prior art magnetic bearing structures in providing a separate low reluctance path for each of a pair of separate coils that separately excite or vary the magnetic flux in each of the gaps. By exciting the two coils in a manner such that as the sum of the total flux levels in the two air gaps varies, radial stiffness between the stator and rotor axis is controlled. In contrast, exciting the same two coils in a manner whereby the difference between the total fluxes in the gaps varies, provides control for axial forces between the stator and rotor, with resulting axial position control. The radial stiffness or force tending to align the rotor and stator axes increases as the average of the total fluxes increases. The net axial force is such as to shift the rotor to narrow the air gap having the greater flux density, the magnitude of the force being essentially proportional to the difference in magnetic flux in the two gaps. To simultaneously vary both the axial and radial forces, means are provided for exciting the two coils with two pulse width modulated current pulse trains, the difference between the pulse widths controlling one of the forces and the sum of the pulse widths controlling the other force.

Other objects, features and advantages of one main embodiment of the present invention will be apparent upon a perusal of the following description in conjunction with the appended drawings.

DETAILED DESCRIPTION OF THE DRAWING

Figure 1:
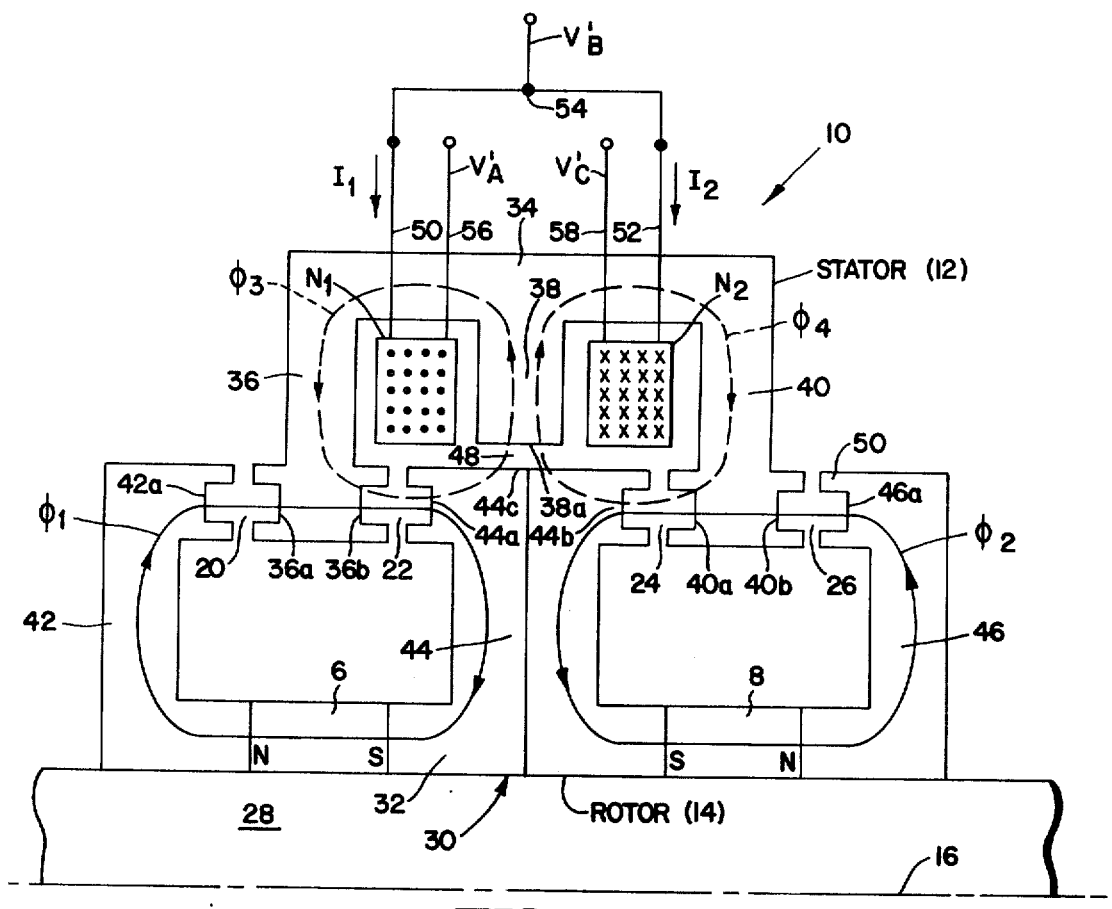
FIG. 1 is a one-half cross-sectional view through the axis of the magnetic bearing including coils $N_1$ and $N_2$. The various parts of the bearing may be completely visualized by rotating the cross-section about the bearing axis.

Referring to FIG. 1, the magnetic bearing 10 comprises a radially overlapping outer stator 12 and inner rotor 14 which are normally held coaxially aligned with each other, and with a bearing axis 16 that forms a center line of non-magnetic shaft 28 to which the remainder of the rotor is bonded. Control for the relative radial and axial forces between stator 12 and rotor 14 is provided by magnetic forces concentrated in four spaced apart axial gaps 20, 22, 24 and 26 defined between interleaved portions of the rotor and stator.

Four distinct magnetic circuits, characterized by toroidal rotating flux paths $\phi_1$ - $\phi_4$, exist which cross various of the axial gaps. The two circuits, characterized by fluxes $\phi_1$ and $\phi_2$, are driven constantly in opposite rotational senses by aligned annular permanent magnets 6 and 8, respectively, which are axially magnetized in opposite directions. Magnets 6 and 8 are axially spaced apart and form a part of rotor root central cylinder portions 32. The circuit characterized by $\phi_1$ includes magnet 6 and serially excited lefthand axial gaps 20 and 22 while the circuit characterized by $\phi_2$ includes the permanent magnet 8 and serially excited righthand axial gaps 26 and 24. The permanent magnets 6 and 8 provide equal and opposite bias fluxes, $\phi_1$ in the lefthand gaps 20 and 22 and $\phi_2$ in the righthand gaps 29 and 26 which alone result in a constant radial stiffness. If the rotor should be radially eccentrically displaced from the stator by some disturbing force, the reluctance of each of the paths $\phi_1$ and $\phi_2$ increases, tending to decrease the magnitude of fluxes $\phi_1$ and $\phi_2$. As a result, a radially directed restoring force inherently results which tends to restore the magnetic flux to a maximum by decreasing the reluctance.

As in the prior art, it is necessary to sense the axial displacement of the rotor and vary the difference between the magnetic fluxes in the gaps on the right and lefthand sides in accordance with the sensed displacement which is transformed into an input signal for a control loop providing axial stiffness. To this end, as taught in previously cited copending application, Ser. No. 100,637, a single magnetic coil for variably serially exciting the lefthand gap 22 and the righthand gap 24 with a flux to aid one of the bias fluxes and to buck the other could produce the necessary axial force. However, in accordance with an aspect of the present invention, two axially spaced, separately excited annular coils or windings $N_1$ and $N_2$ carried by stator 12 are provided, instead of a single winding, to provide sufficient freedom to vary the radial stiffness as well as providing the usual axial force.

Coil $N_1$ is wound on stator 12, nominally coaxially with axis 16, to produce a rotating magnetic flux $\phi_3$ which passes through interior lefthand gap 22 to the exclusion of the other gaps 20, 24, and 26, while coil $N_2$ is wound on the stator about axis 16 to produce a rotating flux $\phi_4$ which passes through interior righthand gap 24 to the exclusion of the other gaps. The coils $N_1$ and $N_2$, which preferably have the same number of turns, are respectively excited by currents $I_1$ and $I_2$. The fluxes $\phi_3$ and $\phi_4$ are respectively directed counterclockwise and clockwise when the currents $I_1$ and $I_2$ are positive. If equal positive currents $I_1$ and $I_2$ are applied to the coils $N_1$ and $N_2$ the flux $\phi_3$ aids the flux $\phi_1$ in gap 22 and the flux $\phi_4$ aids the flux $\phi_2$ in gap 24. As a result the total fluxes in gaps 22 and 24 are equally increased and an increased radial stiffness force results. If equal negative currents $I_1$ and $I_2$ are applied, the fluxes $\phi_3$ and $\phi_4$ being respectively directed clockwise and counterclockwise tend to buck the fluxes $\phi_1$ and $\phi_2$ in the interior gaps 22 and 24. As a result, the total flux in interior gaps 22 and 24 is decreased and the radial stiffness is decreased. If equal currents $I_1$ and $I_2$ are applied so that $I_1$ is positive and $I_2$ is negative, both fluxes $\phi_1$ and $\phi_2$ are directed counterclockwise. As a result, $\phi_3$ aids $\phi_1$ in gap 22 while $\phi_4$ bucks $\phi_2$ in gap 24. In that case, the radial stiffness is not substantially affected because the sum of the total fluxes in the interior gaps remains constant. Instead, an axial force is exerted between the rotor 14 and stator 12 in a direction tending to narrow gap 22 by axial relative movement of the rotor 14 and stator 12, since that gap has a greater total flux than gap 24. Similarly, applying equal currents $I_1$ and $I_2$ with $I_2$ positive, $I_1$ negative results in a force tending to narrow the gap 24.

It should thus be apparent that both axial and radial forces are controlled in response to the currents $I_1$ and $I_2$. In particular, the sum of the currents $I_1$ and $I_2$, and consequently of the fluxes $\phi_3$ and $\phi_4$, controls the radial stiffness force while the difference between the currents $I_1$ and $I_2$, and consequently the fluxes $\phi_3$ and $\phi_4$, controls axial force.

The magnetic circuits will now be fully described. The stator 12 comprises an outer root low reluctance cylindrical portion from which three radially inwardly extending low reluctance annular portions 36, 38 and 40 project. The central portion 38 terminates in a broad radially facing pole piece 38a, while the two end portions 36 and 40 each terminate in a pair of axially opposed axially facing sharp pole pieces 36a and 36b and 40a and 40b, respectively. The extensions 36 and 40 are radially interleaved between three low reluctance radial outwardly directed annular rotor extensions 42, 44 and 46 from root cylinder portion 32 to define the four axial gaps 20, 22, 24 and 26. Rotor end extensions 42 and 46 terminate in axially inwardly directed sharp pole pieces 42a and 46a, respectively, facing opposite pole pieces 36a and 40b to respectively define exterior axial gaps 20 and 26. Rotor central extension 44 terminates in two opposed axially outwardly facing sharp pole pieces 44a and 44b, respectively, facing opposite pole pieces 36b and 40a to respectively define the interior axial gaps 22 and 24. In addition, between the axial pole pieces 44a and 44b, rotor extension 44 terminates in a radially facing pole piece 44c facing opposite stator radial pole piece 38a to define the radial gap 48. The sharp axial pole pieces are each formed of a plurality of radially thin concentric cylindrical walls 50 providing a large flux density and therefore a large change in axial gap reluctance for a small radial displacement or eccentricity. The pole pieces 38a and 44c for the radial gap are broad enough to provide a low flux density bridge for the fluxes $\phi_3$ and $\phi_4$.

Magnet 6 is located on the lefthand side of the rotor between rotor radial extensions 42 and 44 and produces flux $\phi_1$ which flows through those radial extensions and serially through the pole pieces for lefthand gaps 20 and 22. Similarly, magnet 8 is located on the righthand side between rotor radial extensions 44 and 46 and produces flux $\phi_2$ which flows through those extensions and serially through the pole pieces for righthand gaps 26 and 24. Coil $N_1$ is fixedly secured to the stator and located on the lefthand side between stator extensions 36 and 38 and produces flux $\phi_3$ which flows through a portion of the root cylinder 34, through those two extensions and radially through the pole pieces for the interior lefthand axial gap 22 and the central radial gap 48. Similarly, coil $N_2$, located on the righthand side of the stator between inward extensions 38 and 40, produces flux $\phi_4$ which flows through a portion of the root cylinder 34 and serially through the pole piece pairs 40a, 44b and 44c, 38a for the interior right-hand axial gap 24 and the radial gap 48.

Figure 2:
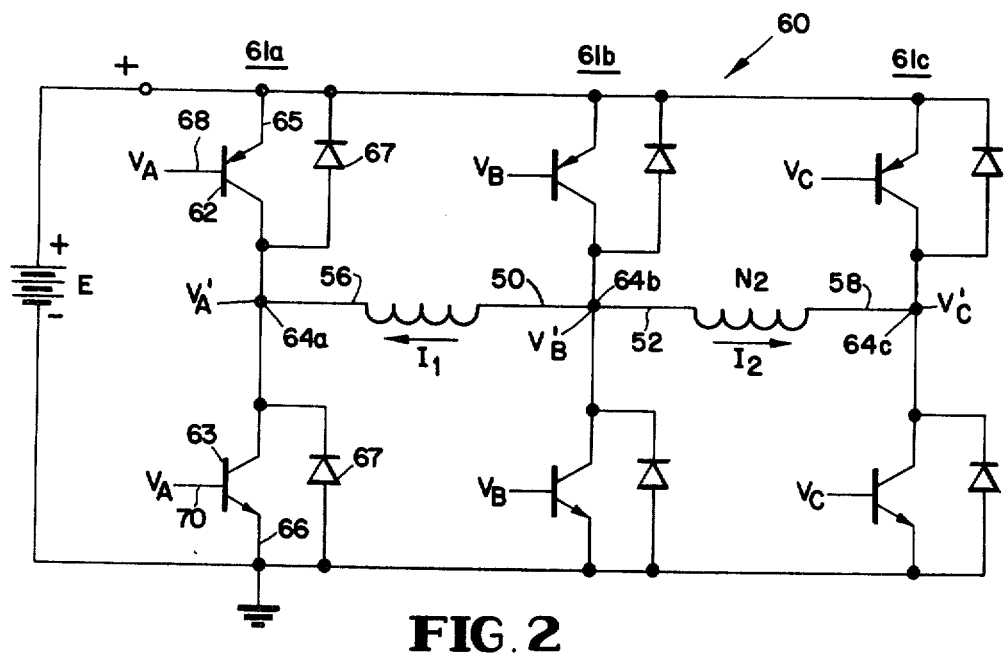
FIG. 2 is an electrical schematic diagram of a power bridge circuit for driving the coils $N_1$ and $N_2$ in response to control voltages.

The leads 50 and 52 of the coils $N_1$ and $N_2$, respectively from which the currents $I_1$ and $I_2$ flow into the coils are electrically connected together at point 54 and a control voltage $V'_B$ is applied thereto. Control voltages $V'_A$ and $V'_C$ are respectively applied to the other leads 56 and 58 of coils $N_1$ and $N_2$. Control voltages $V'_A$, $V'_B$, $V'_C$ which drive the currents $I_1$ and $I_2$ to simultaneously produce both the desired radial stiffness and axial force are derived from the power bridge circuit 60 of FIG. 2. The power bridge 60 (FIG. 2) comprises three sets 61a, 61b and 61c of series complementary power transistors 62 and 63 connected across a d.c. voltage source of E volts. The coils $N_1$ and $N_2$ are respectively connected across different pairs of common transistor collectors 64a, 64b and 64c for each set wherein at any given time only one of the transistors of each set conducts for controlling the direction of the currents $I_1$ and $I_2$. The voltage signals $V'_A$, $V'_B$, and $V'_C$ which are derived from the common transistor collectors 64a, 64b and 64c, respectively, are periodically switched between E volts and zero volts in response to control signals $V_A$, $V_B$ and $V_C$ respectively coupled to the transistor base electrodes for each set. The PNP transistor 62 emitters 65 are connected to the positive side of the supply while the emitters 66 of the NPN transistors are connected to the, preferably grounded, negative side of the supply. Normally reverse biased damper diodes 67 shunt the collector, emitter terminals of the power transistors to provide a current path for transients encountered in switching the coil currents.

Figure 3:
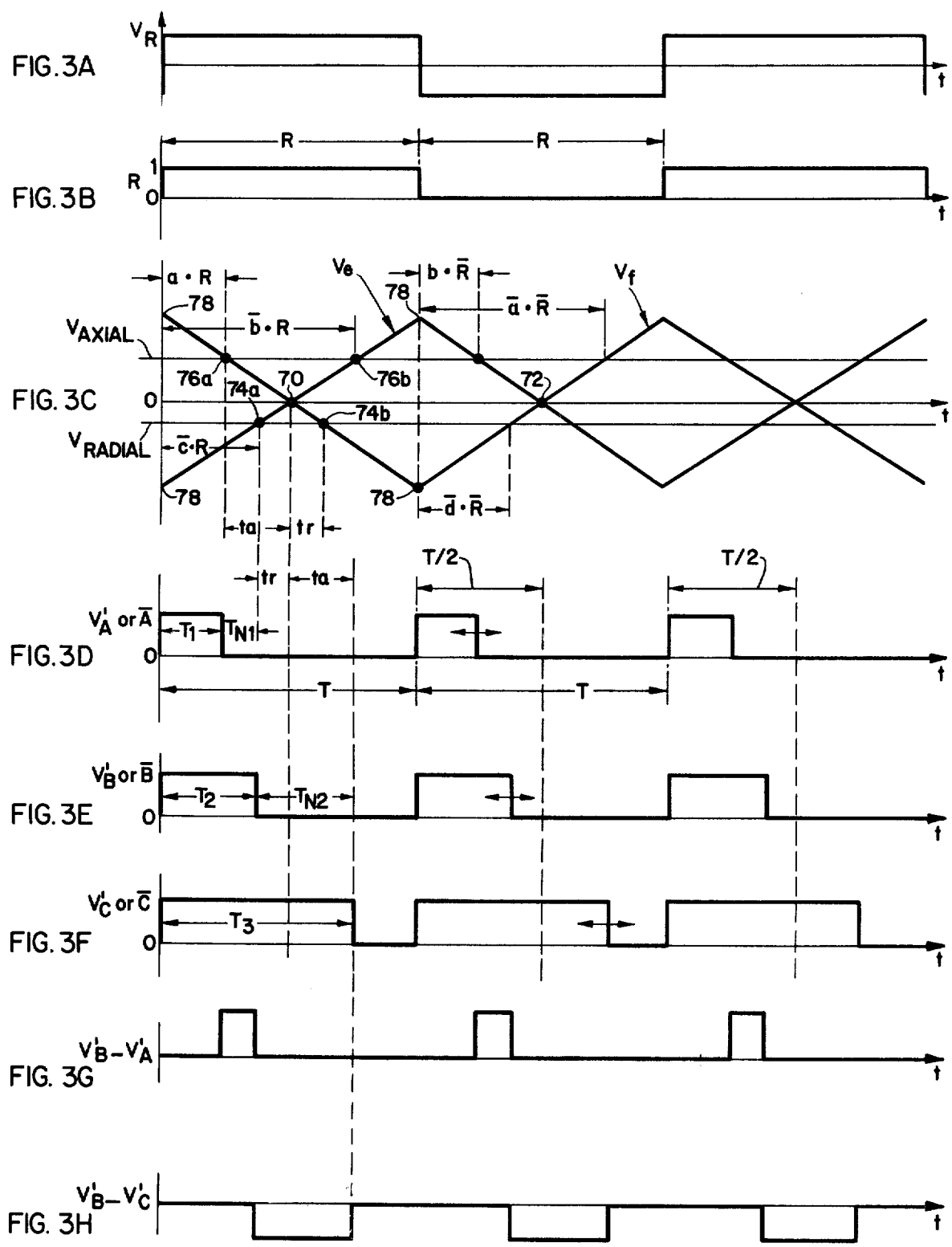
FIGS. 3A through 3H are aligned timing diagrams indicating the generation of the control voltages for the power bridge of FIG. 2 as derived by the circuit of FIGS. 4A and 4B.

Essentially, only the output power transistors of the bridge circuit 60 are shown and it is assumed that appropriately biased voltages of the proper amplitude, having the general voltage variations $V_A$, $V_B$ and $V_C$ which are inverse to the two-level signals of FIGS. 3D through 3F are supplied by driver transistors to the bases 68 and 70 of transistors 62 and 63 such that when any of the control variations $V_A$, $V_B$ or $V_C$ are at the higher of the two voltage levels, the associated transistor 62 is cut off while the associated transistor 63 is saturated and when any of the control variations is at the lower level the associated transistor 62 is saturated and the associated transistor 63 is cut off. Thus, for example when voltage $V_B$ is at a relatively high level the associated collector voltage $V'_B$ is at a low level (zero), while when the voltage $V_B$ is at a relatively low level the collector voltage $V'_B$ is at a high level (E). Thus for simplicity, it is convenient to observe that the variation of $V'_B$ is the inverse of the variation of $V_B$. $V'_A$ and $V_A$, $V'_C$ and $V_C$ are similarly related.

Figure 4A:
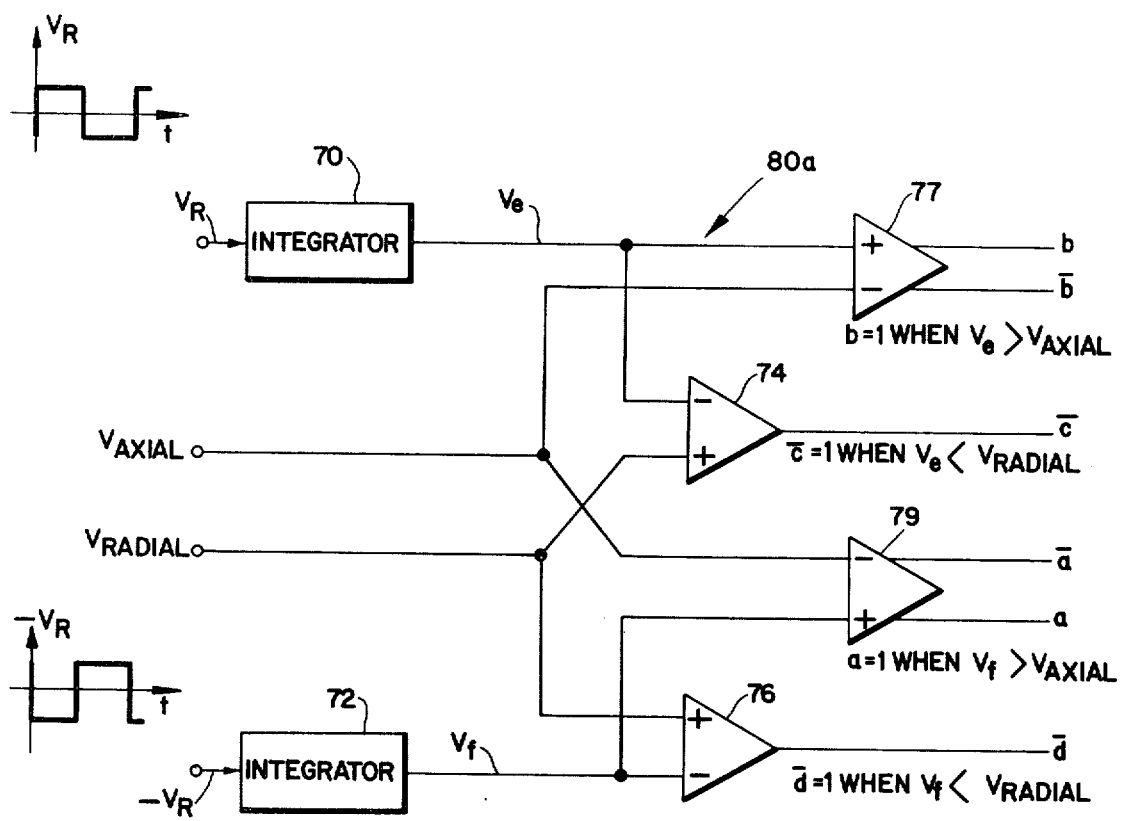
FIGS. 4A and 4B are electrical schematic diagrams of a control circuit, drawn in two parts for ease of understanding, for controlling the bridge circuit of FIG. 2.
Figure 4B:
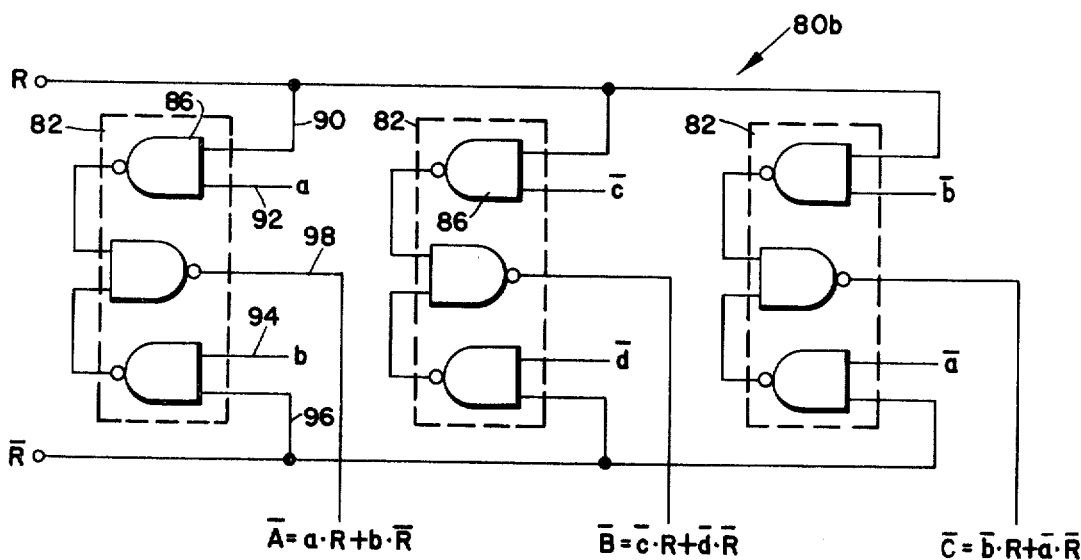

FIGS. 3A through 3F are plots of the various waveforms derived from the circuits of FIGS. 4A and 4B for driving the power bridge 60 while FIGS. 3G and 3H indicate the resultant pulse train coil voltages $V'_B - V'_A$ and $V'_B - V'_C$. In FIG. 4A, a reference square wave analog signal $V_R$ (FIG. 3A) derived from control oscillator 61 in FIG. 5 and its negative $-V_R$ are respectively integrated by integrators 70 and 72 to produce triangular waves $V_e$ and $V_f$ that are phase displaced 180°. $V_e$ and $V_f$ are respectively compared with separate, d.c. input command signals $V_{axial}$ and $V_{radial}$ having magnitudes and polarities indicative of the amount and direction of axial force and radial stiffness to be applied between the bearing members 12 and 14. In response to the comparison, there are derived coil voltage pulse trains having a frequency of twice the reference square wave $V_R$.

An overview of the operation of the circuits is helpful. It should be noted that a digital square wave R (FIG. 3B) which is in phase with $V_R$ is also supplied from control oscillator 61. The digital signal $\overline{R}$ is the logical inverse of R. As will be noted the two triangular waves $V_e$ and $V_f$ cross each other and zero volts simultaneously twice each cycle of $V_R$ and R, once at the center 70 of the positive portion of $V_R$ and portion where R equals logical one and once at the center 72 of the negative portion of $V_R$ or portion where R equals logical zero. As can be observed the period of time "$t_r$" between the point 70 and the points 74a and 74b (to the left and right of 70 and 72) where $V_{radial}$ crosses either $V_e$ or $V_f$ is proportional to the radial signal, the constant of proportionality being related to the slope of the triangular wave signals $V_e$ and $V_f$. Similarly the times "$t_a$" between the point 70 and the intersection of $V_{axial}$ with either $V_f$ or $V_e$ at points 76a and 76b (to the left and right of 70 or 72) is proportional to the axial signal for the same reasons.

The three synchronous overlapping collector voltage pulse trains $V'_A$, $V'_B$, $V'_C$ of FIGS. 3D through 3F are derived by driving the power bridge 60 with appropriate analog signals. $V_A$, $V_B$, and $V_C$ are derived from the inverse of the logic outputs $\overline{A}$, $\overline{B}$, and $\overline{C}$ from logic circuitry 80b (FIG. 4B). $V'_A$ is a pulse train of pulse width $T_1$ where $V'_A$ is at voltage E during the period of time between the reference point 78, where both the signals $V_e$ and $V_f$ are at an extremum, and the next point 76a where $V_{axial}$ intersects either $V_e$ or $V_f$, $V'_A$ is zero volts during other times. $V'_B$ is at voltage E during the period of time $T_2$ between reference point 78 and the next $V_{radial}$ intersecting point 74a, and $V'_C$ is E volts during the period of time $T_3$ between reference point 78 and the second occurring $V_{axial}$ intersection point 76b. As is further apparent, voltage is applied to coil $N_1$ only during the time when $V'_A$ and $V'_B$ are different and in a direction determined by which is at E volts. Thus, during time $T_{N_1}$ between points 76a and 74a since $T_1$ is zero and $T_2$ is E volts the voltage $V'_B - V'_A$ (FIG. 3G) is in the positive direction while during other times the voltage is zero. Thus, the average current of the pulse train $I_1$ is proportional to $T_{N_1}$. Similarly, during the time $T_{N_2}$ between points 74a and 76b, where $V'_C$ is E volts and $V'_B$ is zero volts. The voltage $V'_B - V'_C$ is in the negative direction (FIG. 3H) during $T_{N_2}$ while during other times the voltage is zero. The average current is therefore negative and proportional to $T_N$. As can be readily observed from FIGS. 3A-3H, the sum of $T_{N_1}$ and $T_{N_2}$ is twice $t_a$ and the difference of $T_{N_2}$ and $T_{N_1}$ is twice $t_r$. Thus, the sum and difference of the averages of currents $I_1$ and $I_2$ are seen to be proportional to the $V_{axial}$ and $V_{radial}$ signals.

In further understanding the operation of the pulse width modulation technique it is interesting to note that if both $V_{axial}$ and $V_{radial}$ are zero no current flows, since each of $V'_A$, $V'_B$ and $V'_C$ are symmetrical square waves and if only $V_{radial}$ is zero $V'_B$ is a symmetrical square wave.

The logic signals $\overline{A}$, $\overline{B}$, and $\overline{C}$, are derived by first deriving logic signals $a, \overline{a}, b, \overline{b}, c$ and $d$ in control circuitry 80a of FIG. 4A by comparing $V_{axial}$ and $V_{radial}$ with $V_e$ and $V_f$ in comparators 74, 76, 77 and 79. The logic signals $b$ and $\overline{b}$ are derived from comparator 77 which compares $V_e$ and $V_{axial}$ such that b equals logical one and $\overline{b}$ equals logical zero only when $V_e$ is greater than $V_{axial}$. The logic signals a and $\overline{a}$ are similarly derived from comparator 79 which compares $V_f$ and $V_{axial}$. Logic output $c$, derived from comparator 74 is logical one when $V_e$ is less than $V_{radial}$, and logic signal $d$ is logical one when $V_f$ is less than $V_{radial}$. Since the signals $V_e$ and $V_f$ exchange roles in alternate half cycles (in FIG. 3C, compare points 70 and 72), it is reasonable to expect the signals a and $\overline{c}$ will respectively exchange roles with the signals b and $\overline{d}$, every half cycle, since the corresponding symbols only differ in their dependence on either $V_e$ or $V_f$. In FIGS. 3B to 3F it is observed that time $T_1$ is equal to the time for which both a is logical one ($V_f > V_{axial}$) and R is logical one in the first half cycle of R characterized by point 70 but for the next half cycle of R characterized by point 72 the time $T_1$ is equal to the time for which both b is logical one and $\overline{R}$ is a logical one (R is a logical zero). Similarly the time $T_2$, in the first half cycle, is the time for which $\overline{c}$ is a logical one and R is logical one, while in the second half cycle $T_2$ is the time for which both $\overline{d}$ is a logical one and $\overline{R}$ is a logical one. Furthermore, $T_3$, in the first half cycle is the time for which both $\overline{b}$ is a logical one ($V_{axial} > V_e$) and R is a logical one, while $T_3$ in the second half cycle is the time for which both $\overline{a}$ is a logical one ($V_{axial}$ $> V_f$) and $\overline{R}$ is a logical one.

The logic circuitry $80b$ of FIG. 4B performs the required logic operations to the signals $a, \overline{a}, b, \overline{b}, c, \overline{d}, R$ and $\overline{R}$ for producing the logic driving signals $\overline{A}, \overline{B}, \overline{C}$ of FIGS. 3D through 3F. Circuitry $80b$ consists of three separate identical logic gate combinations 82, each having four inputs 90, 92, 94, 96 and an output 98 for deriving one of the driving signals. Each of the gate combinations 82 is composed of three interconnected NAND gates 86 or other suitable gates arranged such that the output on line 98 is equal to that obtained by: (1) ANDing the input signals on lines 90 and 92; (2) ANDing the input signals on lines 94 and 96; and then (3) ORing the results of the two AND operations to arrive at the output on line 98. The two AND operations provide means for deriving the various pulse train widths $T_1$-$T_3$ separately for the first and second half cycles characterized by points 70 and 72 while the OR operation provides means for combining the corresponding separate half cycle pulse trains.

Figure 5:
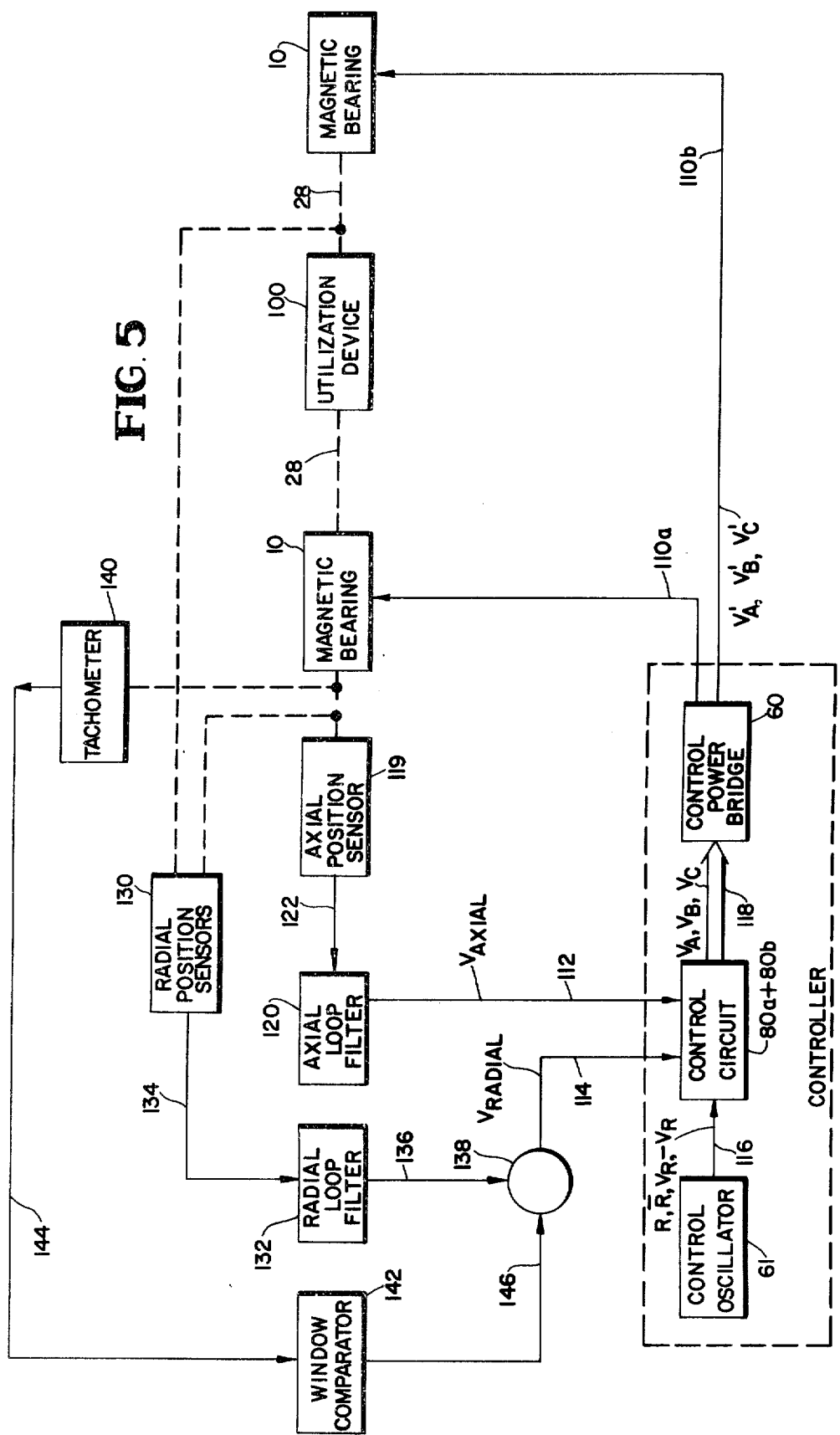
FIG. 5 is a system block diagram of a control loop utilizing a pair of the magnetic bearings of FIG. 1 and including two types of radial stiffness control.

FIG. 5 is a block diagram schematic indicating the magnetic bearing 10 in a control loop for both radial and axial control. As should be apparent from that figure, in actuality two magnetic bearings 10 are used to support the ends of a utilization device 100, to be mounted for rotation. Utilization device 100 is attached fixedly to each of the shafts 28 emerging from each magnetic bearing 10. The control power bridge 60 shown in FIG. 5 is essentially the same power bridge as in FIG. 2, with the understanding that the coils $N_1$ and $N_2$ are located in each of the magnetic bearings 10. The outputs of the bridge 60 are the voltages $V'_A$, $V'_B$ and $V'_C$ which are transmitted on lines $110a$ and $110b$ to each of the magnetic bearings for driving the coil currents. The control circuits $80a$ and $80b$, of FIGS. 4A and 4B, are fed by the axial command signal $V_{axial}$ on line 112 and by the radial stiffness command signal $V_{radial}$ on line 114. The control circuit is also fed by control oscillator 61 with signals R, $\overline{R}$, $V_R$, and $-V_R$ on lines 116. The control circuits $80a$ and $80b$ derive signals $V_A$, $V_B$, $V_C$ on lines 118 which are fed to the power bridge 60.

The axial loop includes the magnetic bearings and conventional axial sensor 119 which transduces the amount of axial movement of the bearing rotors 14 to an electrical signal in sensor output line 122. Axial sensor 119 may be of any type generally used in conjunction with prior art magnetic bearings such as an optical sensor or a magnetic sensor, for example a magnetic resistor for sensing changes in the flux density in a magnetic bearing axial gap. The output error signal from the axial sensor on line 122 is fed to an axial loop filter 120 which contains the appropriate dynamic response shaping or compensating networks for stabilizing the axial servo loop. The output 112 of the axial loop filter 120 is the signal $V_{axial}$ which essentially is a force command to the magnetic bearings 10 driving the control circuits $80a$ and $80b$.

The radial circuit is configured to incorporate radial stiffness control into two main control loop functions. Each of the two main control loop functions may be mechanized without the other and are shown together only for convenience. In one function the ability to control radial stiffness is used to damp any radial motion of the bearing 10. Therein, radial position sensors 130 sense the magnitude of the radial eccentricity of the magnetic bearing rotor 14 with respect to the stator 12. It should be apparent to those skilled in the art that suitable position sensors 130 such as an optical sensor positioned to view the rotor shaft 28 or a system of magneto resistor sensors embedded in a bearing radial gap are well known. Preferably, there is one such sensor associated with each magnetic bearing 10 supporting the utilization device. Position sensors 130 derive a signal proportional to the radial eccentricity of the bearing rotors 14 which are fed to a radial loop filter 132 via line 134. Loop filter 132 includes a differentiator for producing a damping signal on loop filter output line 136. The loop filter output passes through a summing device 138 which couples the damping signal to the control circuit input on line 114.

In the other function for radial stiffness control, a tachometer 140 transduces the angular velocity of the rotor 14 and the tachometer output signal is connected to a window comparator 142 via line 144. The window comparator provides means for selectively switching the radial stiffness of the bearings 10 and consequently the vibrational resonances of the bearing/utilization device combination. The vibrational resonances which are dependent on both radial stiffness and angular velocity are switched to avoid a vibrational resonance condition. The window comparator output on line 146 is fed to the summing device 138 to form a second component of the radial stiffness control signal $V_{radial}$ on line 114. The output of window comparator 142 is a bilevel signal having one of two discrete levels dependent on the magnitude of the tachometer signal on line 144, either a zero level or a high level. With a zero output level, the radial stiffness of the bearings is determined by the bias fluxes $\phi_1$ and $\phi_2$ while with a high output level fluxes $\phi_3$ and $\phi_4$ are generated to aid the bias fluxes and to thereby increase the radial stiffness. The output of window comparator is at a relatively high level when the tachometer signal is within a window straddling an angular velocity where a vibrational resonance would exist if the output were zero. Increasing the radial stiffness and thereby moving the angular velocity for resonance above the window obviates the existence of a resonance condition.

Having described one main embodiment of the invention, it should be apparent that numerous modifications may be made within the spirit and scope of the invention. Therefore, it is intended the details of the main embodiment be interpreted as illustrative and not in a limiting sense.

What is claimed is:

1. An axially servoable magnetic bearing having a controllable radial stiffness comprising:
    a bearing rotor having a pair of axially spaced, axially facing annular pole pieces;
    a bearing stator generally coaxially disposed with respect to the rotor, said stator having a corresponding pair of axially spaced, axially facing, annular pole pieces, each stator pole piece facing an opposite corresponding one of the rotor pole pieces so as to define first and second axially spaced annular axial are gaps between the rotor and stator; and
    controllable magnetic flux generating means for independently varying magnetic flux through each of the two airgaps.

2. The apparatus of claim 1 in combination with control means for exciting the flux generating means in a manner for varying the sum of the total fluxes in the two air gaps in order to vary the radial stiffness and for varying the difference in the total fluxes for axially shifting the bearing rotor.

3. The apparatus of claim 2 wherein the flux generating means comprises a pair of axially spaced coils coaxial with the rotor, each coil positioned to produce flux in a corresponding one of the two air gaps.

4. The apparatus of claim 3 where the flux generating means includes means for generating constant bias fluxes through each of the two air gaps.

5. The apparatus of claim 4 wherein the means for generating constant bias fluxes includes an additional pair of annular axial air gaps defined by additional corresponding annular pole pieces of the rotor and stator.

6. The apparatus of claim 3 wherein the first and second coils are excited by coil currents, the control means including means for exciting the two coils with pulse width modulated current pulse trains.

7. The apparatus of claim 6 wherein the first and second coils each have a pair of terminals, one of each pair being connected together to form three terminals for the two coils, the means for exciting the two coils with pulse-width modulated current pulse trains including means for exciting the three driving terminals with three synchronous overlapping voltage pulse trains.

8. The apparatus of claim 7 wherein the control means is responsive to an axial signal and a radial signal and includes means for generating a triangular wave signal and means for comparing the radial signal and the axial signal with the instantaneous amplitude of the triangular wave signal.

9. The apparatus of claim 8 wherein the control means includes means for generating a second triangular wave signal inverted from the first mentioned triangular wave signal and means for comparing the radial signal and the axial signal with the instantaneous amplitude of the second triangular wave signal.

10. The apparatus of claim 1 in combination with means for sensing the angular velocity of the rotor and means for varying the radial stiffness in response to the sensed angular velocity.

11. The apparatus of claim 1 in combination with means for sensing the radial eccentricity of the bearing rotor response to the sensed eccentricity.

12. An axially servoable magnetic bearing having a controllable radial stiffness comprising:
- a bearing rotor having four axially spaced annular pole pieces and a radially facing annular pole piece;
- a bearing stator generally coaxially disposed with respect to the rotor, said stator having corresponding four axially spaced, axially facing pole pieces, a radially facing annular pole piece, each stator pole piece facing an opposed corresponding one of the rotor pole pieces so as to define four axially spaced annular gaps and a radial gap between the rotor and stator;
- coil means for exciting in series the radial gap and a first of the axial gaps;
- coil means for exciting in series the radial gap and a second of the axial gaps;
- permanent magnetic means for constantly exciting in series the first and a third of the gaps; and
- permanent magnetic means for constantly exciting in series the second and a fourth of the axial gaps.

* * * * *